US006789102B2

(12) United States Patent
Gotou et al.

(10) Patent No.: US 6,789,102 B2
(45) Date of Patent: *Sep. 7, 2004

(54) SYSTEM FOR RETRIEVING INFORMATION BASED ON POSITION OF COMMUNICATION TERMINAL

(75) Inventors: Shinichirou Gotou, Wako (JP); Takeshi Imai, Wako (JP); Masayuki Ikegami, Wako (JP); Hideshi Sawada, Wako (JP); Toshihide Youfu, Wako (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,755

(22) Filed: Jul. 29, 1998

(65) Prior Publication Data

US 2001/0003825 A1 Jun. 14, 2001

(30) Foreign Application Priority Data

Jul. 31, 1997 (JP) .............................. 9-206956

(51) Int. Cl.[7] .............................. G06F 15/16; G06F 7/00
(52) U.S. Cl. ...................................... 709/203; 707/104.1
(58) Field of Search ........................ 709/203; 379/812; 345/333, 335, 744, 864; 707/104.1; 701/201–202, 207–213

(56) References Cited

U.S. PATENT DOCUMENTS

| 5,470,233 A | * | 11/1995 | Fruchterman et al. ...... 340/988 |
| 5,648,768 A | * | 7/1997 | Bouve ........................ 340/988 |
| 5,732,074 A | * | 3/1998 | Spaur et al. ................. 370/313 |
| 5,784,059 A | * | 7/1998 | Morimoto et al. .......... 345/854 |
| 5,802,492 A | * | 9/1998 | DeLorme et al. ........... 455/456 |
| 5,848,373 A | * | 12/1998 | DeLorme et al. ........... 701/200 |
| 5,870,741 A | * | 2/1999 | Kawabe et al. ................ 707/5 |
| 5,893,093 A | * | 4/1999 | Wills ............................. 707/5 |
| 5,910,799 A | * | 6/1999 | Carpenter et al. .......... 345/866 |
| 5,926,116 A | * | 7/1999 | Kitano et al. ................ 340/988 |
| 5,944,769 A | * | 8/1999 | Musk et al. ................. 701/201 |
| 5,946,687 A | * | 8/1999 | Gehani et al. ................ 707/10 |
| 5,948,040 A | * | 9/1999 | DeLorme et al. ........... 701/201 |

(List continued on next page.)

FOREIGN PATENT DOCUMENTS

| JP | 07-262493 | 10/1995 |
| JP | 09-008917 | 1/1997 |
| JP | 09-166450 | 6/1997 |
| JP | 09-200346 | 7/1997 |
| WO | WO 97/07467 A1 | * 2/1997 |

OTHER PUBLICATIONS

Gralla, P., "How the Internet Works—Special Edition," Ziff–Davis Press, pp. 160–172, 1994.*
Kennedy, P., "MOBILEWEB Changing the Face of Mobile Networking Through Universal Wireless Connectivity," Northcon/96, IEEE, pp. 89–94, Nov. 1996.*
Monoka, Yoshimasa, Information Service for Mobile Terminals: WildBird—A Map–based Service on the Internet. Fijitsu, Japan, Fujitsu Limited, p. 194–199 (1997).

*Primary Examiner*—Andrew Caldwell
(74) *Attorney, Agent, or Firm*—Arent Fox PLLC.

(57) ABSTRACT

An information retrieval system is provided, by which necessary information can be easily and accurately obtained from among a large number of information items by using a communication terminal which is mounted to a movable object or is fixedly disposed. In the system, a communication terminal accesses a host server and sends the server the present position of the terminal so as to retrieve desired information stored in information servers connected to a network. The host server stores summary information, categories, and positional information on the information stored in the information servers, and the communication terminal identifies an information server according to the above information stored in the host server.

11 Claims, 7 Drawing Sheets

U.S. PATENT DOCUMENTS

| | | | | |
|---|---|---|---|---|
| 5,959,577 A | * | 9/1999 | Fan et al. | 342/357.13 |
| 5,983,227 A | * | 11/1999 | Nazem et al. | 707/10 |
| 5,991,739 A | * | 11/1999 | Cupps et al. | 705/26 |
| 6,009,403 A | * | 12/1999 | Sato | 705/6 |
| 6,014,090 A | * | 1/2000 | Rosen et al. | 340/905 |
| 6,023,232 A | * | 2/2000 | Eitzenberger | 340/988 |
| 6,046,689 A | * | 4/2000 | Newman | 340/996 |
| 6,049,711 A | * | 4/2000 | Ben-Yehezkel et al. | 455/414 |
| 6,055,536 A | * | 4/2000 | Shimakawa et al. | 707/101 |
| 6,107,961 A | * | 8/2000 | Takagi | 342/357.13 |
| 6,122,520 A | * | 9/2000 | Want et al. | 455/456 |
| 6,138,072 A | * | 10/2000 | Nagai | 701/207 |
| 6,154,745 A | * | 11/2000 | Kari et al. | 707/100 |
| 6,167,255 A | * | 12/2000 | Kennedy, III et al. | 455/414 |
| 6,199,014 B1 | * | 3/2001 | Walker et al. | 701/211 |
| 6,263,343 B1 | * | 7/2001 | Hirono | 800/279 |
| 6,577,714 B1 | * | 6/2003 | Darcie et al. | 379/93.17 |
| 6,604,083 B1 | * | 8/2003 | Bailey | 705/10 |
| 6,650,998 B1 | * | 11/2003 | Rutledge et al. | 701/211 |

* cited by examiner

FIG.5

| No. | MENU NAME | NAME | URL OF INFORMATION SERVER | LOCATION | RECTILINEAR DISTANCE L | A<L<B ? |
|---|---|---|---|---|---|---|
| 1 | GUIDE TO HOT SPRINGS | ◇◇ HOT SPRING | http://xxxx.or.jp | X=x1, Y=y1 | $\sqrt{(x1-x0)^2+(y1-y0)^2}$ | ◯ |
| 2 | GUIDE TO HOT SPRINGS | △△ HOT SPRING | http://oxox.or.jp | X=x2, Y=y2 | $\sqrt{(x2-x0)^2+(y2-y0)^2}$ | ◯ |
| 3 | GUIDE TO HOT SPRINGS | ×× HOT SPRING | http://ooxx.or.jp | X=x3, Y=y3 | $\sqrt{(x3-x0)^2+(y3-y0)^2}$ | ◯ |
| 4 | GUIDE TO HOT SPRINGS | □□ HOT SPRING | http://xoox.or.jp | X=x4, Y=y4 | $\sqrt{(x4-x0)^2+(y4-y0)^2}$ | ◯ |
| ⋯ | ⋯ | ⋯ | ⋯ | ⋯ | ⋯ | ⋯ |

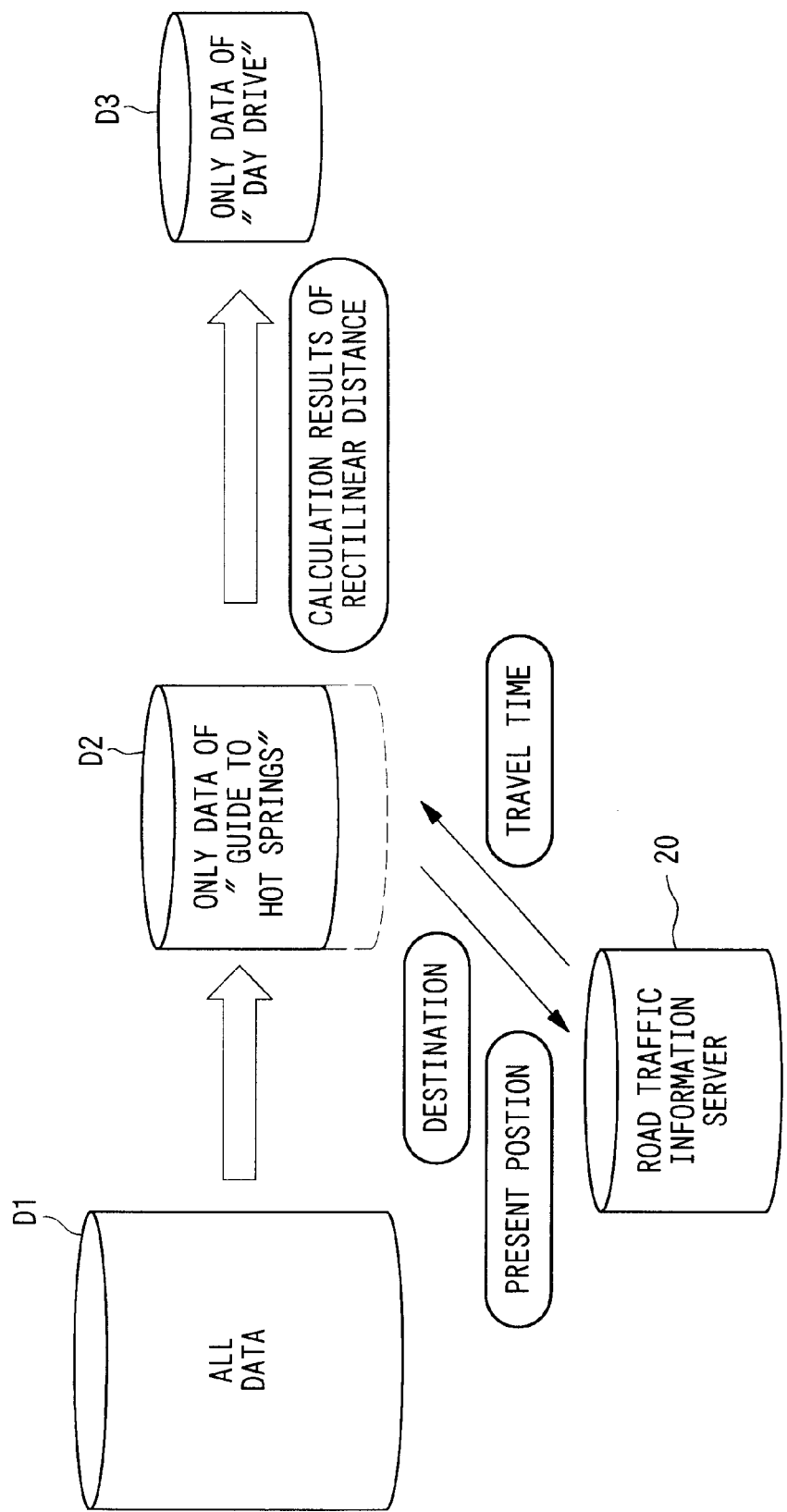

SYSTEM FOR RETRIEVING INFORMATION BASED ON POSITION OF COMMUNICATION TERMINAL

BACKGROUND OF THE INVENTION

1. Field of the Invention

The present invention relates to an information retrieval system in which any information item stored in plural information servers is retrieved via a host server. This application is based on Patent Application No. Hei 9-206956 filed in Japan, the contents of which are incorporated herein by reference.

2. Description of the Related Art

Regarding conventional vehicle navigation systems respectively mounted to plural vehicles, the following method is known such that positional information of a relevant vehicle is sent to another vehicle having a similar system, and positional information of another vehicle is also received by the relevant vehicle and the indicated position of the other vehicle is shown on a map, where the relevant vehicle is shown at the center of the map.

In recent vehicle navigation systems such as the VICS (Vehicle information and Communication System), the following method is known such that traffic information (relating to a closed area or a traffic jam caused by construction, an accident, etc.) sent from an information center, which is originally provided by a specific organization or the like, is received and displayed on a monitor screen, and a new route for avoiding the traffic jam or the like is presented based on the received traffic information.

On the other hand, information communication via the Internet is widely spread nowadays, and various information items can easily be obtained from world-wide computers connected to the Internet. Usually, in information servers (homepages, or the like) connected with the Internet, detailed information items (i.e., contents) are stored in correspondence to a URL (Uniform Resource Locator) of the server in the network.

Regarding the above-mentioned navigation systems, the former can acquire only positional information of other vehicles, while the latter can acquire only traffic information provided by an information center. That is, the amount of possibly acquired information is restricted. In contrast, in information communication via the Internet, a great amount of information can be acquired. However, in this case, connection from a personal computer, a work-station, or the like is necessary on the premise and direct access to the Internet from the existing navigation system has been impossible.

In addition, an extremely great number of computers are connected to the Internet, and it is difficult to judge the content of each information item stored in a server with only reference to the title of a corresponding home page or a relevant URL. Therefore, it is difficult to specify a server which stores information desired by a user.

SUMMARY OF THE INVENTION

In consideration of the above circumstances, an object of the present invention is to provide an information retrieval system by which necessary information can be easily and accurately obtained from among a great amount of information items by using a communication terminal which is mounted on a movable object or is fixedly disposed.

A particular object of the present invention relates to an information retrieval system for acquiring information on a possible destination or various establishments, in which information to be acquired can be specified according to a position corresponding to the information and the present position of a relevant communication terminal.

In order to realize the above objectives, the present invention provides an information retrieval system comprising a communication terminal for retrieving, via a host server, information stored in plural information servers connected to a network, wherein:

the host server stores summary information relating to information items stored in the information servers, addresses of these information servers in the network, and positional information on each information item stored in each information server;

each of the information servers stores relevant information items, summary information, and an address in the network;

the communication terminal accesses the host server and sends present positional information of the communication terminal to the host server;

the communication terminal makes the host server send the communication terminal summary information relating to the information items stored in the information servers and the corresponding addresses in the network, specified according to the positional information on each information item stored in each information server and to the present positional information of the communication terminal;

the communication terminal identifies at least one of the information servers which stores a desired information item according to the received summary information on the information items stored in the information servers; and the communication terminal accesses the identified information server with reference to the received address of the relevant information server in the network.

The positional information on each information item stored in each information server relates to the physical position of an object (like a facility) indicated by the information item stored in a relevant information server. In conventional information servers, such positional information relating to the stored information item is not stored. According to the present invention, it is possible to specify a desired information server (which stores desired information with respect to any place, facility, or the like) with reference to positional relationships between the above physical position (relating to the desired server) and the present positional information of the communication terminal, and to access the desired information server using the address (URL) of the information server.

The present invention can preferably be applied to a navigation system. In this case, the communication terminal is a navigation device mounted to a vehicle; and the navigation device detects the present position of the vehicle and sends information of the present position to the host server, and receives information stored in any information server based on the present position of the vehicle and the address of the information server in the network. If information relating to a destination of a drive is necessary, it is possible to more accurately specify retrieved information suitable for an object of the drive.

Accordingly, necessary information can be easily and accurately obtained from among a large number of information items by using a communication terminal which is mounted on a movable object or is fixedly disposed.

The following structure is also possible in which the host server further stores category data relating to the information items stored in the information servers; and the communication terminal makes the host server send these category data to the communication terminal, sends a desired information category to the host server, and makes the host server send the communication terminal summary information of each information item stored in the relevant information server, specified according to the sent desired information category, and the address of the relevant information server in the network.

In this case, the desired information may more easily be specified according not only to the positional relationship but also to additional summary information on the information servers like category data.

The present invention also provides an information retrieval method in which a communication terminal retrieves, via a host server, information stored in plural information servers connected to a network, wherein:

the host server stores summary information relating to information items stored in the information servers, addresses of these information servers in the network, and positional information on each information item stored in each information server; and each of the information servers stores relevant information items, summary information, and an address in the network, and the communication terminal performs the steps of:
accessing the host server and sending present positional information of the communication terminal to the host server;
making the host server send the communication terminal summary information relating to the information items stored in the information servers and the corresponding addresses in the network, specified according to the positional information on each information item stored in each information server and to the present positional information of the communication terminal;
identifying at least one of the information servers which stores a desired information item according to the received summary information on the information items stored in the information servers; and
accessing the identified information server with reference to the received address of the relevant information server in the network.

The present invention further provides a computer readable storage medium for a communication terminal, which stores an information retrieval program for performing the above steps in the above method.

BRIEF DESCRIPTION OF THE DRAWINGS

FIG. 5 is a diagram for explaining the content of a database possessed by the information center in the embodiment.

FIG. 9 is a typical diagram for illustratively showing the retrieval of a database, performed in the information center in the embodiment.

DESCRIPTION OF THE PREFERRED EMBODIMENTS

Hereinbelow, preferred embodiments of the present invention will be explained with reference to the drawings.

Figure 1:
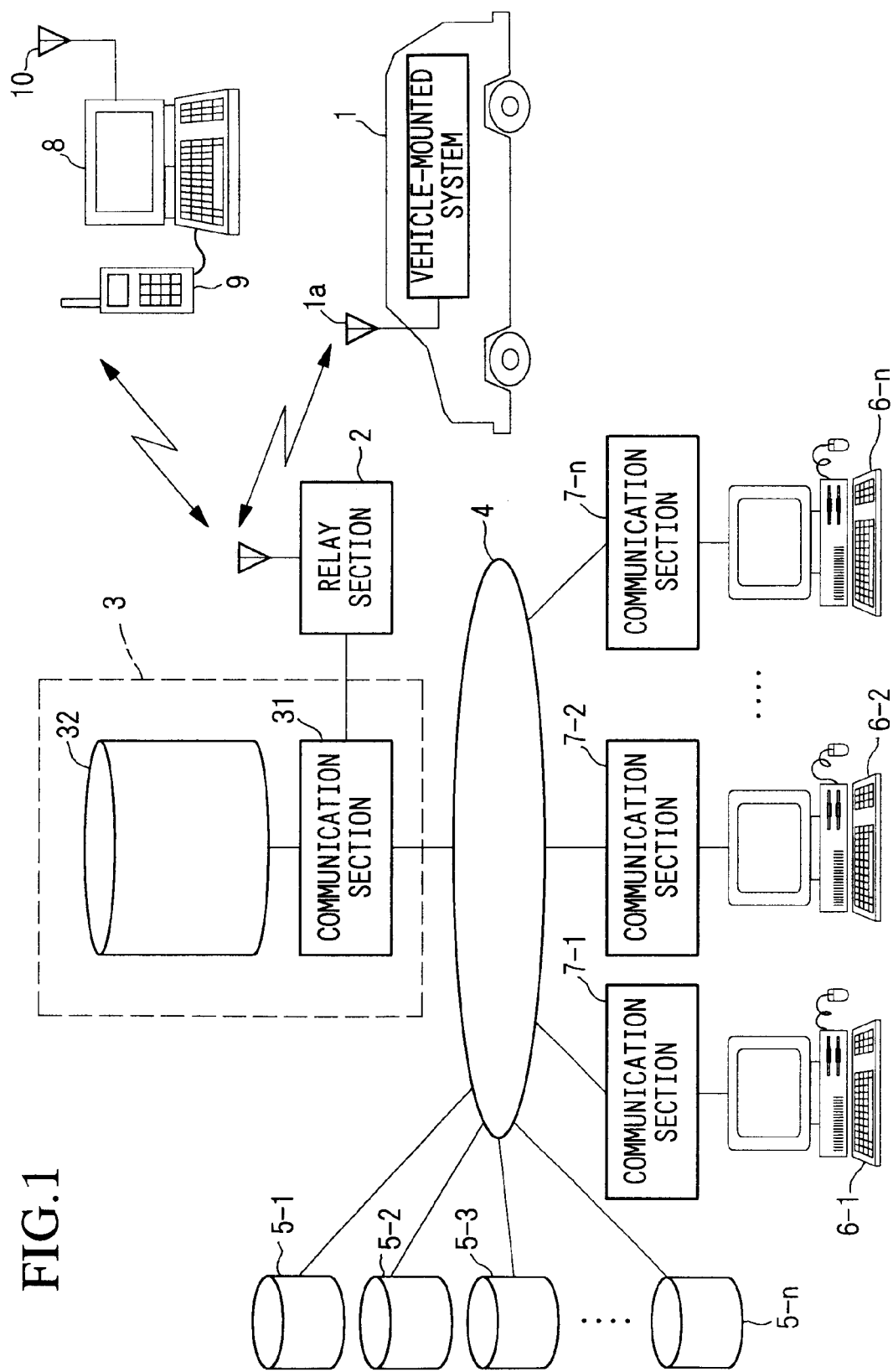
FIG. 1 is a diagram for explaining general construction of an information retrieval system as an embodiment of the present invention.

FIG. 1 is a general block diagram showing construction of a navigation system as an embodiment of the present invention. In the figure, reference numeral 1 indicates the navigation system mounted to a vehicle (hereinbelow, abbreviated to "vehicle-mounted system 1") for indicating a travel path to a destination to a driver by detecting the shortest path to the destination designated by the driver according to the present position of the vehicle, and by indicating the detected shortest path, for example, on a map shown in the monitor screen of a display device (not shown in FIG. 1). In addition, vehicle-mounted system 1 performs wireless data communication with information center 3 via relay station 2 by using vehicle-mounted antenna 1a.

Figure 10A:
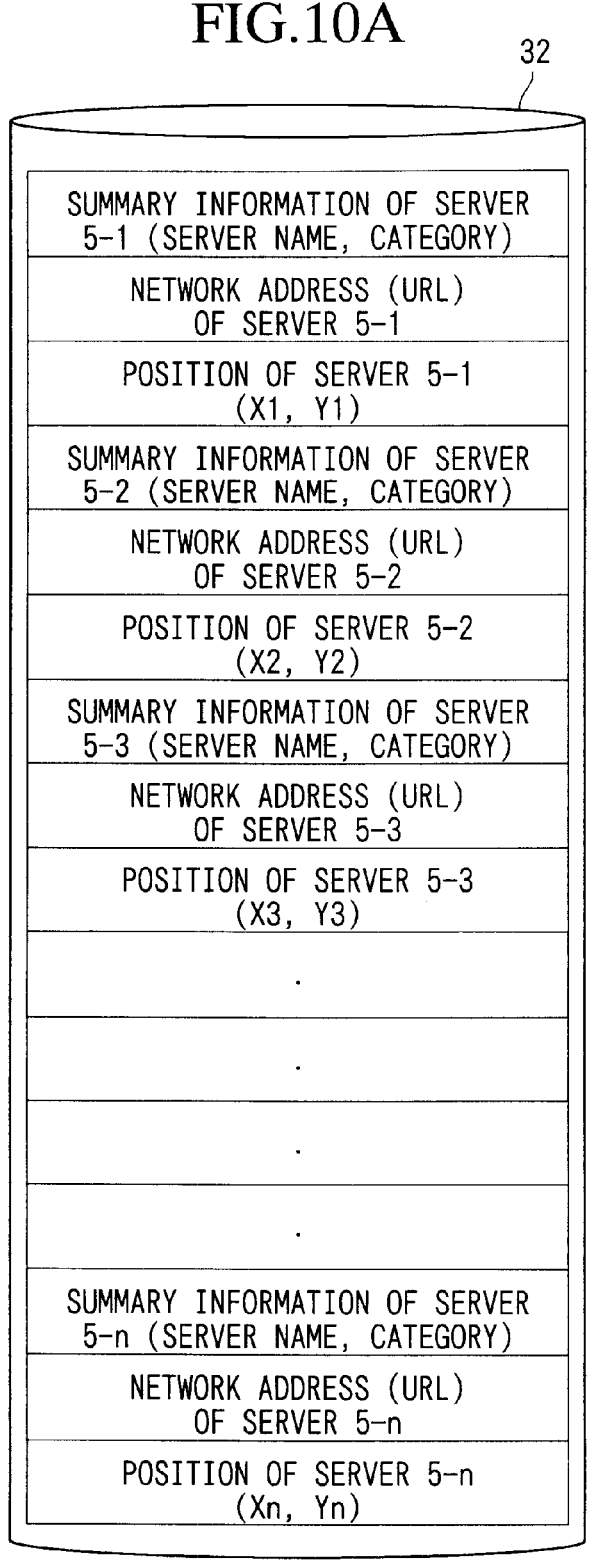
FIG. 10A shows the basic structure of information database 32 in FIG. 1, and FIGS. 10B–10E show the basic structures of each information servers 5-1, 5-2, 5-3, and 5-n in FIG. 1.
Figure 10B:
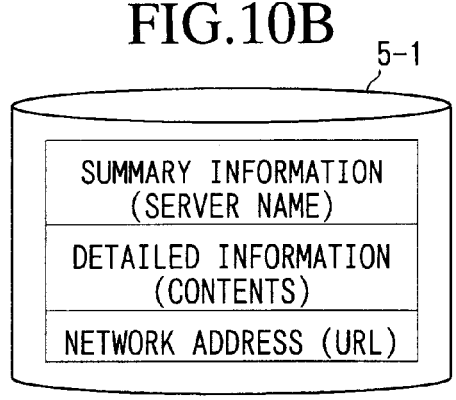
Figure 10C:
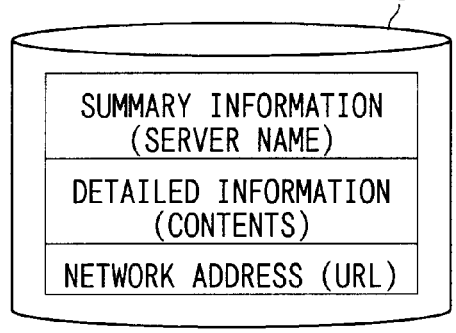
Figure 10D:
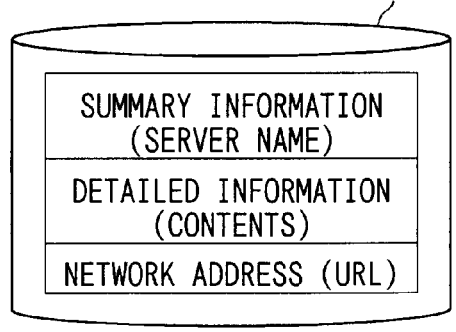
Figure 10E:
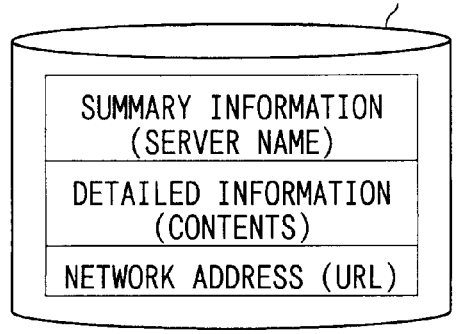

The information center 3 comprises communication section 31 for performing data communication with vehicle-mounted system 1 via the above-mentioned relay station 2 and for performing data communication with other computer terminals via the Internet 4; and information database 32 for storing summary information of information items which information servers 5-1, 5-2, 5-3, . . . , 5-n connected with the Internet 4 respectively store, the information items relating to various facilities, or the like, with data on the category, the URL (Uniform Resource Locator), and the location of each facility (or the like). The basic structure of the information database 32 is shown in FIG. 10A. As shown in the figure, summary information, a network address, and position of each information server are included in the database 32. Here, the "position of each information server" means positional information of each facility whose detailed information is stored in the relevant information server, that is, the "position" does not mean an address of the information server in the network.

The above-described communication section 31 performs data communication not only with vehicle-mounted system 1, but also with notebook-sized personal computer 8 to which cellular phone 9 is connected, and desktop personal computers 6-1, 6-2, . . . , 6-n, respectively, via each corresponding communication section 7-1, 7-2, . . . , 7-n such as a modem or a TA (terminal adapter).

The information servers 5-1, 5-2, 5-3, . . . , 5-n store detailed information items on various facilities such as hot springs, golf courses, concert halls, and the like. The basic structures of each information server 5-1, 5-2, 5-3, and 5-n are respectively shown in FIGS. 10B–10E. As shown in the figures, summary information, detailed information, and a network address are stored in each information server. When a computer terminal accesses the servers via the Internet, an information item stored in any server is provided according to a request from the computer terminal. Character information like guidance or explanations of a relevant facility, or image information showing the exterior or interior of the facility are examples of the above "detailed" information.

The desktop personal computers 6-1, 6-2, . . . , 6-n respectively include storage devices such as a CD-ROM drive and a hard disk drive. In the hard disk of each desktop personal computer, a WWW (World Wide Web) browser, supplied via a storage medium like a CD-ROM, is installed, and thereby it is possible to connect to the Internet 4 and to acquire information from other computer terminals.

In the notebook-sized personal computer 8, a program for communicating with information center 3 via relay station 2 by using cellular phone 9 is installed. The notebook-sized personal computer 8 also includes a GPS antenna 10 and a GPS (Global Positioning System) receiver (not shown in FIG. 1) for detecting the present position of the notebook-sized personal computer 8 by using electric waves from a GPS satellite, received by the above GPS antenna. Hereinbelow, the combination of GPS antenna 10 and the GPS receiver will be called a "GPS kit".

Next, with reference to FIGS. 2–8, retrieval operations of desired information from information items stored in plural servers 5-1, 5-2, 5-3, . . . which are connected to the Internet 4, by using the above-mentioned vehicle-mounted system 1, desktop personal computers, or notebook-sized personal computer, will be explained.

Embodiment of Information Retrieval Using Vehicle-mounted System 1

Figure 2:
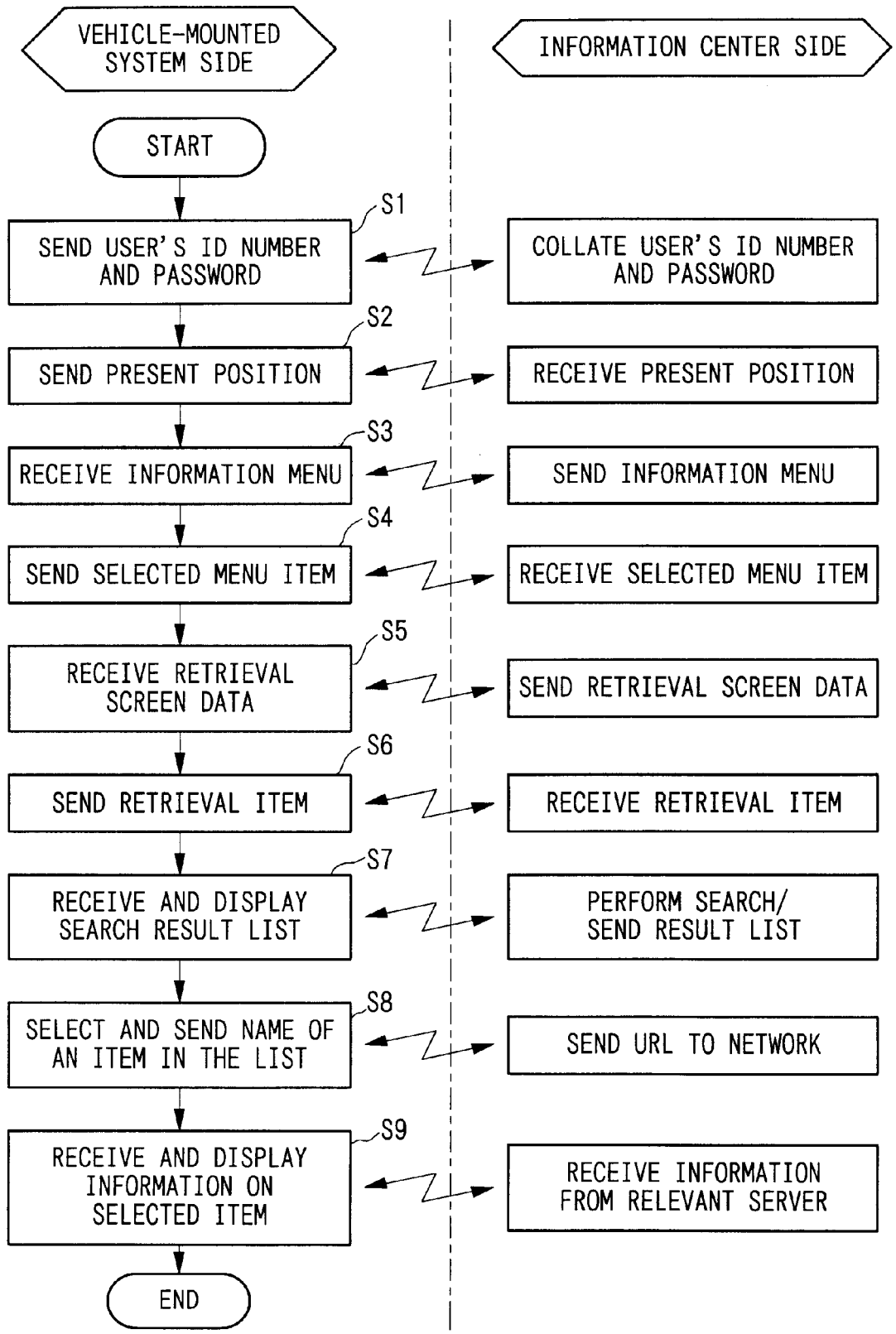
FIG. 2 is a flowchart showing operational procedure of the information retrieval system in the embodiment.
Figure 3:
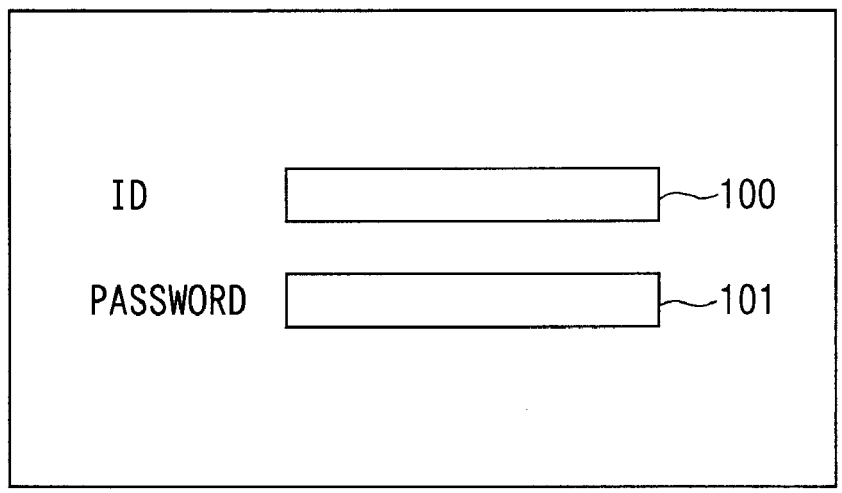
FIG. 3 is a diagram for explaining the content of an authentication screen displayed after accessing the information center.

FIG. 2 includes a flowchart showing operations of this embodiment, performed by vehicle-mounted system 1, for retrieving desired information from servers 5-1, 5-2, 5-3, . . . via information center 3 and a flowchart showing operations performed in the information center 3 side. First, when connection to information center 2 is performed via an operation of a user of vehicle-mounted system 1 (simply called the "user", hereinbelow), a screen indicating authentication as shown in FIG. 3 is shown on a monitor screen of vehicle-mounted system 1. Next, when the user inputs assigned ID number and password respectively into ID number input field 100 and password input field 101, vehicle-mounted system 1 sends the input ID number and password to information center 3 (see step S1).

When the ID number and password sent from vehicle-mounted system 1 are received by information center 3, these data are collated with the previously registered ID number and password of the above user. If both agree with each other, the center performs necessary operations so as to make data communication with the vehicle-mounted system 1 possible. Accordingly, vehicle-mounted system 1 completes the log-in operation in this way, and sends information indicating its own present position (of the vehicle to which vehicle-mounted system 1 mounted) to information center 3 (see step S2). Here, it is assumed that the vehicle to which vehicle-mounted system 1 is mounted is located on coordinates "x0 (the value corresponding to the longitude of the present position), y0 (the value corresponding to the latitude of the present position)" at the present.

Figure 4:
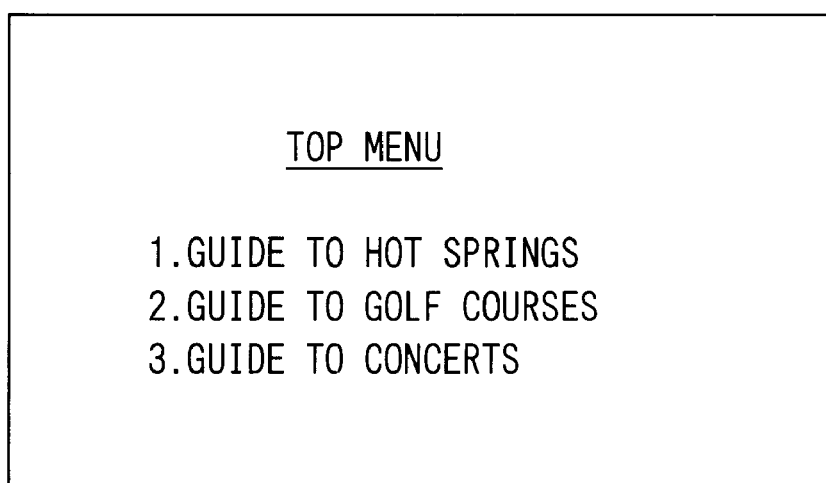
FIG. 4 is a diagram for explaining the content of an information menu (i.e., "top menu") sent from the information center.

When the information center 3 receives the coordinates data (x0, y0) of the present position of vehicle-mounted system 1, the center 3 stores the data and sends an information menu to vehicle-mounted system 1. When vehicle-mounted system 1 receives this information menu (see step S3), the menu as shown in FIG. 4 (i.e., "TOP MENU" in this figure) is displayed on the monitor screen of vehicle-mounted system 1. This information menu indicates possible information categories retrieved by vehicle-mounted system 1. In the case shown in FIG. 4, information items relating to hot springs, golf courses, and concert halls can be retrieved.

When the user selects one of the menu items shown in the information menu, by using a keyboard or the like, vehicle-mounted system 1 sends a selected menu data to information center 3 (see step S4). Here, it is assumed that the user selects "1. GUIDE TO HOT SPRINGS". When the information center 3 receives the menu item selected by the user, the center picks up only information relating to hot springs from among information data stored in information data base 32, and rectilinear distances from the present position of vehicle-mounted system 1 to each picked-up hot spring are calculated based on location data of these hot springs and on the present positional coordinates sent from vehicle-mounted system 1 in the process of step S2. The calculated results are added to the picked-up data.

The stored contents of information database 32 will be explained below with reference to FIG. 5. In the figure, information relating to "MENU NAME", "NAME", "URL OF INFORMATION SERVER", and "LOCATION" is previously stored in the information database 32. On the other hand, information relating to "RECTILINEAR DISTANCE L" and "A≦L<B?" is later added according to user's selection in the information menu and on a retrieval screen (explained later).

Regarding the item "NAME", names of each facility which the user can select finally are stored. Regarding the item "MENU NAME", categories of each facility registered in the "NAME" item are stored. For example, if the name of a hot spring is stored in the "NAME" item, the name "GUIDE TO HOT SPRINGS" is stored as a corresponding "MENU NAME". On the other hand, if the name of a golf course is stored in the "NAME" item, the name "GUIDE TO GOLF COURSES" is stored as a corresponding "MENU NAME".

Regarding the item "URL OF INFORMATION SERVER", the URL of a relevant information server which stores detailed information on each facility registered in the "NAME" item is stored. Regarding the item "LOCATION", coordinate data of the position of each facility registered in the "NAME" item is stored. Here, this coordinate data of the position is represented using a value xn (n corresponding to each number following "No." in FIG. 5) corresponding to the longitude and a value yn corresponding to the latitude. This coordinate data is used for calculating the above-described rectilinear distance L.

Accordingly, when the item "1. GUIDE TO HOT SPRINGS" is selected in the information menu as shown in FIG. 4, information items having the name "GUIDE TO HOT SPRINGS" as the "MENU NAME" are picked up from among all data in information database 32, and rectilinear distances L between vehicle-mounted system 1 and each facility (i.e., hot spring, here) are calculated in turn according to coordinate data of the position stored in the "LOCATION" item of each picked-up data and to the present positional information sent from the vehicle-mounted system 1 in the process of step S2 in FIG. 2, by using a formula "$\sqrt{((xn-x0)+(yn-y0))}$". The calculated results are added to and stored in the item "RECTILINEAR DISTANCE L" of each picked-up data.

In addition, the item "A≦L<B?" in FIG. 5 is provided for further narrowing and reducing the data which were picked up by selecting any "MENU NAME", based on rectilinear distance L. This operation will be explained later.

Figure 6:
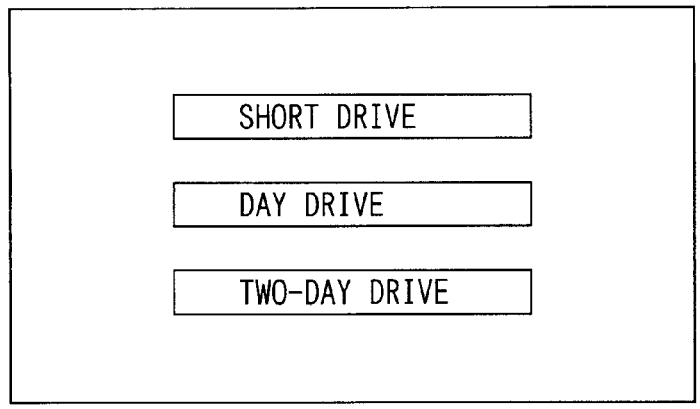
FIG. 6 is a diagram for explaining the content of a retrieval screen sent from the information center.

When the pick-up operation via selection of the information menu and the calculation of rectilinear distances L are completed in information center 3 as described above, the information center 3 sends data of a retrieval screen to vehicle-mounted system 1. When the vehicle-mounted system 1 receives this retrieval screen data (see step S5), the picture shown in FIG. 6 is shown on the monitor screen of vehicle-mounted system 1. In FIG. 6, three kinds of retrieval items such as "SHORT DRIVE", "DAY DRIVE", and "TWO-DAY DRIVE" are shown. Each retrieval item corresponds to the rectilinear distance from the present position of the vehicle to each relevant hot spring. That is, if the user selects, for example, the item "SHORT DRIVE" on this retrieval screen after selecting "1. GUIDE TO HOT SPRINGS" in the process of step S4, possible hot springs to be retrieved are those less than 30 km far from the present position of the relevant vehicle, as the rectilinear distance.

Similarly, if the user selects the item "DAY DRIVE" on this retrieval screen, possible hot springs to be retrieved are those of a rectilinear distance from 30 km or more to less than 100 km from the present position of the relevant vehicle. Furthermore, if the user selects the item "TWO-DAY DRIVE", then possible hot springs to be retrieved are those of a rectilinear distance from 100 km or more to less than 200 km from the present position of the relevant vehicle. When the user designates any retrieval item on the retrieval screen of FIG. 5, vehicle-mounted system 1 sends the selected retrieval item to information center 3 (see step S6). Here, it is assumed that the user selects the item "DAY DRIVE".

When the information center 3 receives the retrieval item sent from vehicle-mounted system 1, the relational expression "A≦L<B" (shown in FIG. 5) in database 32 is defined such that the value "A" is 30 and the value "B" is 100 in the present case. Therefore, if any previously-calculated rectilinear distance value L exists from "30 or more" to "less than 100", then judgmant "○" (i.e., "yes") is provided as information with respect to "A≦L<B". Accordingly, in the center 3, hot springs of rectilinear distance L of "from 30 km or more to less than 100 km" measured from the vehicle-mounted system 1 are selected to be retrieved, from among the picked-up hot springs.

The information center 3 next sends the names of the selected hot springs to vehicle-mounted system 1 as item names in a search result list. In this operation, the URL of each information server which stores detailed information on each hot spring included in the list is added to the search result list. When the vehicle-mounted system 1 receives the search result list, a summary list of the hot spring names suitable for the retrieval conditions relating to the search of information center 3 (i.e., "day drive" and "hot springs") is displayed on the monitor screen of vehicle-mounted system 1 with the above retrieval conditions (see step S7).

Figure 7:
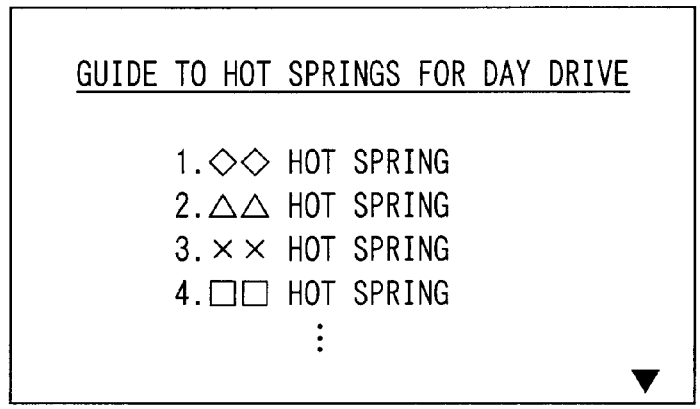
FIG. 7 is a diagram for explaining the content of a search result list sent from the information center.

Here, the mark "▼" appearing in the lower right of FIG. 7 is displayed when many hot springs suitable for the necessary conditions have been picked up and all names thereof cannot be shown in the same screen. When the user selects this mark by using a keyboard or the like, the displayed screen is changed and other hot spring names suitable for the conditions are shown in succession.

When the user next selects the name of a desired hot spring from items shown on the monitor screen of the vehicle-mounted system 1, that is, from among the hot spring names, vehicle-mounted system 1 sends a relevant added URL of the information server which stores detailed information relating to the selected hot spring, to the Internet 4 via communication section 31 of information center 3 (see step S8). Here, it is assumed that the user selects "1. ◇ ◇ HOT SPRING" from among selectable names shown in FIG. 7.

Figure 8:
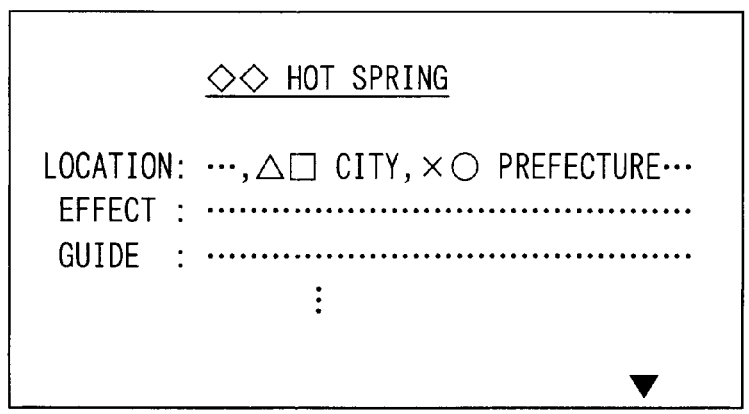
FIG. 8 is a diagram for explaining the content of example information sent from an information server, in an embodiment of the vehicle navigation system according to the present invention.

Accordingly, vehicle-mounted system 1 can access the information server which stores detailed information relating to the "◇ ◇ hot spring" via the Internet. When the system 1 receives desired information, detailed information relating to the selected hot spring is displayed on the monitor screen, as shown in FIG. 8 (see step S9).

In the above-explained embodiment, in the retrieval screen as shown in FIG. 6, each retrieval item corresponds to rectilinear distance L. However, if a server which receives a destination and the present position of a relevant vehicle and then sends a travel time to the destination (called a "road traffic information server", hereinbelow) is connected to the Internet 4, then each retrieval item may correspond to a travel time.

Retrieval procedure in this case will be explained with reference to FIG. 9, based on the explanations of the above embodiment. When the user selects the item in the information menu as shown in FIG. 4, only data relating to the item "GUIDE TO HOT SPRINGS" (see reference numeral D2 in FIG. 9) are picked up from all data (see reference numeral D1 in FIG. 9) in information database 32. Information relating to the location of each picked-up hot spring and the present position of the relevant vehicle are then sent to the road traffic information server (see reference numeral 20 in FIG. 9), and thereby a time necessary for travel from the present position of the vehicle to each hot spring and rectilinear distance L are added to each data only relating to the item "GUIDE TO HOT SPRINGS".

Next, data of the retrieval screen as shown in FIG. 6 is sent from information center 3, where correspondence rules between each retrieval item and the travel time are defined as follows.

(a) If the item "SHORT DRIVE" is selected, then possible hot springs to be retrieved are those having a travel time of less than one hour from the present position of the vehicle.

(b) If the item "DAY DRIVE" is selected, then possible hot springs to be retrieved are those having a travel time from one hour or more to less than three hours from the present position of the vehicle.

(c) If the item "TWO-DAY DRIVE" is selected, then possible hot springs to be retrieved are those having a travel time from three hours or more to less than five hours from the present position of the vehicle.

Here, it is assumed that the item "DAY DRIVE" is selected on the retrieval screen, then only data relating to the item "DAY DRIVE" (see reference numeral D3 in FIG. 9), that is, data relating to hot springs of a travel time of from one hour or more to less than three hours from the present position of the vehicle, are retrieved from among data relating only to the item "GUIDE TO HOT SPRINGS". The results of the search are shown as a list form on the monitor screen of vehicle-mounted system 1.

As explained above, in this variation, the retrieval items on the retrieval screen as shown in FIG. 6 (i.e., "SHORT DRIVE", "DAY DRIVE", and "TWO-DAY drive") correspond not to the rectilinear distance from the present position of the vehicle to each hot spring, but to the travel time; thus, information desired by the user can be more accurately and suitably retrieved.

Embodiment of Information Retrieval From Desktop Personal Computers 6-1, 6-2, . . . , 6-n Hereinbelow, another embodiment will be explained in which desktop personal computer 6-1 accesses information center 3 so as to retrieve desired information. The following operational procedure may also be performed by desktop personal computers 6-2, . . . , 6-n so as to retrieve desired information.

First, a user of desktop personal computer 6-1 starts a WWW browser installed in this desktop personal computer 6-1 and establishes connection to the Internet 4. The user then designates the URL of information center 3 so as to access the information center 3, and thereby a screen indicating authentication as shown in 3 is shown on a monitor screen of the desktop personal computer 6-1. The user then inputs assigned ID number and password respectively to ID number input field 100 and password input field 101.

In this way, an authentication process is performed in the information center 3, and if the input ID number and password agree with the previously registered ID number and password of this user, then data communication with desktop personal computer 6-1 becomes possible. The user then inputs previously-measured positional information of this set-up desktop personal computer 6-1 by using a keyboard or the like, and sends the input information to information center 3.

This positional information is similar to the above-mentioned "present positional information" sent from vehicle-mounted system 1 to information center 3, that is, coordinate data represented by a value x corresponding to the longitude and a value y corresponding to the latitude.

After that, according to the operational procedure from step 3 in the flowchart as shown in FIG. 2, an information server storing desired information is searched, and a search result list (refer to FIG. 7) is displayed on the monitor screen of desktop personal computer 6-1. The user then selects any one of displayed items in the search result list displayed on the monitor, and accesses the information server which stores information relating to the selected item so as to acquire the desired information.

As described above, information retrieval similar to that performed by vehicle-mounted system 1 is also possible in this case using a desktop personal computer, and thereby with a rectilinear distance from the user's house or a travel time as a retrieval condition, information which can be acquired via the Internet can be retrieved. Therefore, accurate information retrieval, effective for preparing a family itinerary, or the like, is possible.

In the above-described case, after authentication is performed in information center 3, the set-up position of desktop personal computer 6-1 is manually input using a keyboard or the like, and is sent to information center 3. However, the above set-up positional information may be previously stored in a hard disk or the like, and when an ID number and a password respectively input into ID number input field 100 and password input field 101 are sent to information center 3, the positional information stored in the hard disk (or the like) may also be sent. Here, the information center 3 side receives the positional information sent with the ID number and password after authentication. In this case, it is possible for a user of the desktop personal computer 6-1 to dispense with inputting the set-up position.

Embodiment of Information Retrieval From Notebook-sized Personal Computer 8

Hereinbelow, another embodiment will be explained in which notebook-sized personal computer 8 accesses information center 3 so as to retrieve desired information.

First, the user of notebook-sized personal computer 8 starts a previously installed communication program, and accesses information center 3 using cellular phone 9. Accordingly, a screen indicating authentication as shown in 3 is shown on a monitor screen of the notebook-sized personal computer 8. The user then inputs assigned ID number and password respectively to ID number input field 100 and password input field 101.

In this way, an authentication process is performed in the information center 3, and if the input ID number and password agree with previously registered ID number and password of the user, then data communication with notebook-sized personal computer 8 becomes possible. When the notebook-sized personal computer 8 performs a log-in operation with respect to information center 3, the present position of the notebook-sized personal computer 8, measured by the GPS kit, is sent to information center 3 via the operation according to the communication program installed in notebook-sized personal computer 8.

This positional information is similar to the above-mentioned "present positional information" sent from vehicle-mounted system 1 to information center 3, that is, coordinate data represented by a value x corresponding to the longitude and a value y corresponding to the latitude.

After that, similar to the above cases relating to vehicle-mounted system 1, and desktop personal computers 6-1, 6-2, . . . , 6-n, according to the operational procedure from step 3 in the flowchart as shown in FIG. 2, an information server storing desired information is searched, and a search result list (refer to FIG. 7) is displayed on the monitor screen of notebook-sized personal computer 8. Accordingly, the user then selects any one of displayed items in the search result list, and accesses the information server which stores information relating to the selected item so as to acquire the desired information.

Here, a map database containing map information of various areas, which can be supplied using a storage medium like a CD-ROM, and a program having a so-called car navigation function may be installed in the notebook-sized personal computer 8. In this way, the notebook-sized personal computer 8 can have functions similar to those of the above-explained vehicle-mounted system 1. Even in a case in which such a car navigation function and a GPS kit are not provided, if the above-mentioned communication program for enabling communication with information center 3 is installed, then information retrieval similar to the above-described retrieval performed by desktop personal computer 6-1, 6-2, . . . , 6-n can be performed.

What is claimed is:

1. An information retrieval system for use in a vehicle comprising:
   a communication terminal for retrieving, via communication with a host server connected to a network, information stored in plural information servers connected to the network wherein:
   each of the information servers stores an information item of a same category and an address in the network;
   the host server stores summary information relating to the information item stored in each information server, the addresses of the information servers in the network, and positional information on each information item;
   the communication terminal accesses the host server and sends positional information of the communication terminal to the host server;
   the host server sends an information menu indicating information categories to the communication terminal, obtains a reply from the communication terminal indicating a desired information category, then calculates a distance from the communication terminal to the position of each information item in the desired information category based on the positional information of the communication terminal and the positional information on each information item, then sends the communication terminal an information menu for specifying one of a plurality of travel times, obtains a reply from the communication terminal indicating the specified travel time, then selects information items suitable to be displayed on a display of the communication terminal, the calculated distances of which are within a predetermined distance range corresponding to the specified travel time, and sends the communication terminal the summary information relating to the selected information items and the addresses of the corresponding information servers in the network;

the communication terminal identifies at least one of the information servers which stores a desired information item according to the received summary information on the information items;

the communication terminal accesses the identified information server with reference to the received address of this information server in the network; and the communication terminal is mounted on the vehicle.

2. An information retrieval system as claimed in claim 1, wherein:

the host server further stores category data relating to the information items stored in the information servers.

3. An information retrieval system as claimed in claim 1, wherein:

the communication terminal is a navigation device mounted to a vehicle; and the navigation device detects the present position of the vehicle and sends information of the present position to the host server, and receives the summary information relating to the information items selected based on the present position of the vehicle, and the addresses of the corresponding information servers.

4. An information retrieval system as claimed in claim 1, wherein the predetermined distance range is manually input by a user of the communication terminal.

5. An information retrieval method for use in a vehicle in which a communication terminal retrieves, via communication with a host server connected to a network, information stored in plural information servers connected to the network, wherein:

each of the information servers stores an information item of a same category and an address in the network; and the host server stores summary information relating to the information items stored in each information server, the addresses of the information servers in the network, and positional information on each information item, and the communication terminal is mounted on the vehicle and performs the step of:

accessing the host server and sending positional information of the communication terminal to the host server, and the host server performs the following steps in the following order:

sending an information menu indicating information categories to the communication terminal; obtaining a reply from the communication terminal indicating a desired information category;

calculating a distance from the communication terminal to the position of each information item in the desired information category based on the positional information of the communication terminal and the positional information on each information item;

sending the communication terminal an information menu for specifying one of a plurality of travel times;

obtaining a reply from the communication terminal indicating the specified travel time;

selecting information items suitable to be displayed on a display of the communication terminal, the calculated distances of which are within a predetermined distance range corresponding to the specified travel time; and sending the communication terminal the summary information relating to the selected information items and the addresses of the corresponding information servers in the network, and the communication terminal further performs the steps of:

identifying at least one of the information servers which stores a desired information item according to the received summary information on the information items; and accessing the identified information server with reference to the received address of this information server in the network.

6. An information retrieval method as claimed in claim 5, wherein the host server further stores category data relating to the information items stored in the information servers.

7. An information retrieval method as claimed in claim 5, wherein:

the communication terminal is a navigation device mounted to a vehicle;

in the step of sending present positional information of the communication terminal, the navigation device detects the present position of the vehicle and sends information of the present position to the host server; and in the step performed by the host server of sending the communication terminal summary information relating to the selected information items, the navigation device receives the summary information relating to the information items selected based on the present position of the vehicle, and the addresses of the corresponding information servers.

8. An information retrieval method as claimed in claim 5, wherein the predetermined distance range is manually input by a user of the communication terminal.

9. A computer readable storage medium for a communication terminal for use in a vehicle which stores an information retrieval program by which the communication terminal retrieves, via communication with a host server connected to a network, information stored in plural information servers connected to the network, each of the information servers storing an information item of a same category and an address in the network, and the host server storing summary information relating to the information items stored in each information server, the addresses of the information servers in the network, and positional information on each information item, the information retrieval program comprising the processes of:

accessing the host server and sending positional information of the communication terminal to the host server, wherein the communication terminal is mounted in the vehicle;

making the host server send an information menu indicating information categories to the communication terminal, obtain a reply from the communication terminal indicating a desired information category, then calculate a distance from the communication terminal to the position of each information item in the desired information category based on the positional information of the communication terminal and the positional information on each information item, then send the communication terminal an information menu for specifying one of a plurality of travel times, obtain a reply from the communication terminal indicating the specified travel time, then select information items suitable to be displayed on a display of the communication terminal, the calculated distances of which are within the predetermined distance range corresponding to the specified travel time, and sends the communication terminal the summary information relating to the selected information items and the addresses of the corresponding information servers in the network;

identifying at least one of the information servers which stores a desired information item according to the received summary information on the information items; and accessing the identified information server with reference to the received address of this information server in the network.

10. The computer readable storage medium as claimed in claim 9, wherein:

the host server further stores category data relating to the information items stored in the information servers.

11. A computer readable storage medium as claimed in claim 9, wherein the predetermined distance range is manually input by a user of the communication terminal.

* * * * *